United States Patent [19]
Donald

[11] Patent Number: 5,852,689
[45] Date of Patent: Dec. 22, 1998

[54] METHOD FOR MAKING FLUID OPTICAL SWITCHES

[75] Inventor: David K. Donald, Monte Sereno, Calif.

[73] Assignee: Hewlett-Packard Company, Palo Alto, Calif.

[21] Appl. No.: 842,927

[22] Filed: Apr. 9, 1997

[51] Int. Cl.⁶ .................................................. G02B 6/35
[52] U.S. Cl. ................................................................. 385/21
[58] Field of Search ................................. 385/21, 16, 17, 385/18, 19

[56]  References Cited

U.S. PATENT DOCUMENTS

| | | | |
|---|---|---|---|
| 4,505,539 | 3/1985 | Aktiengesedlachaft | 385/21 |
| 4,988,157 | 1/1991 | Jackel et al. | 385/16 |
| 5,699,462 | 12/1997 | Fouquet et al. | 385/18 |
| 5,732,168 | 3/1998 | Donald | 385/16 |

OTHER PUBLICATIONS

Japanese Patent Application Kokai No. 8–62645; Kokai Publication Date: Mar. 8, 1996; Applicant: Nippon Denshin Denwa K.K.; Inventor: Makoto Sato; Title: Surface Tension/heat Controlled Waveguide Optical Switch and Matrix Type Optical Switch.

Japanese Patent Application Kokai No. 5,88030; Kokai Publication Date: Apr. 9, 1993; Applicants: Hitachi Cable Co. Ltd., Nippon Telegraph and Telephone; Inventors: Toshiaki Katagiri, Hideo Kobayashi; Title: Optical Waveguide Switch.

Japanese Patent Application Kokai No. 8–94866; Kokai Publication Date: Apr. 12, 1996; Applicants: Hitachi Cable Co. Ltd., Nippon Telegraph and Telephone; Inventors: Makoto Sato, Hideo Kobayashi; Title: Optical Waveguide Switch and Its Manufacturing Method.

*Primary Examiner*—John D. Lee
*Assistant Examiner*—Ellen E. Kang
*Attorney, Agent, or Firm*—Pamela Lau Kee

[57] ABSTRACT

The method builds upon the highly repeatable properties of commercial optical fiber, and using commercial fiber for the waveguides in a fabric of optical switches. The method describes assembly of the fabric, locating the intersections, and a structure for placing the mating resistor.

12 Claims, 6 Drawing Sheets

METHOD FOR MAKING FLUID OPTICAL SWITCHES

FIELD OF THE INVENTION

The invention is directed towards the field of optical switches. In particular, the invention pertains to methods for efficiently manufacturing an array of fluid optical switches.

BACKGROUND OF THE INVENTION

Fiber optics are used in a wide variety of applications. One application is in the area of communication systems. For these systems, meshes of switch points cross each other in connecting many sites together. Specifically, information signals, in the form of modulations of laser-produced light, are received from and then transmitted to a plurality of terminals through fiber optic cables.

A switching network selectively directs the information signals to and from the terminals. Often, the switching network first converts light emitted by each transmitting terminal into corresponding electrical signals. The plurality of these electrical signals are directed, each to selected output ports of the switching network, by switched electrical circuitry in the switching network. The interim received electrical signals are finally converted into corresponding modulated light for re-transmission through the fiber optic cables to final receiving terminals. The conversion of the modulated light to electrical signals and then back into modulated light energy, together with the reconfigurable electrical switching circuitry, requires the use of expensive components and/or restricts the potential bandwidth of the data communication system.

Fully optical switches having no interim electrical signal are beginning to be made mechanically. Fibers or mirrors are moved mechanically between sites and a mesh of these mechanical switches is used to connect pluralities of terminals as above. The opto-mechanical switches skip the complex steps of the interim conversion to electrical signals, but the switches and the reconfiguration of the fabrics of switches are slower than desired. The costs and optical losses of these fabrics of switches make fluid optical switches a desired goal.

Fluid optical switches will improve the speed at which fully optical networks may be reconfigured. Since these switches use boiling bubbles to turn the switch points ON and OFF, reconfiguration times can easily be less than 1 ms. These switches have a gas or boilable liquid that obliquely crosses an optical waveguide in a channel. In one example, one or more heater elements use the wet/steam/dry states of thermal ink jet technology to quickly insert, or extract, boilable liquid respectively into, or from the channel. The boilable liquid has an index of refraction close to that of the guide. In the wet state or "bar state" (OFF), the channel contains the liquid and nearly all of the light of the incoming guide traverses the liquid and continues along the "through" axis of the guide. In the dry state or "cross state" (ON), the channel contains gas and the light is internally reflected. The cross light continues down a second "cross" guide at a large angle to the axis of the incoming light guide.

One drawback to these fully optical switches is the high precision required in their fabrication. The resultant high cost and technical risk makes these switches problematic investments. It would be desirable to improve the manufacturing of these switches such that high precision fabrication is eliminated.

SUMMARY OF THE INVENTION

An optical fluid switch is fabricate by forming a lattice in a waveguide plate. Optical fiber segments are inserted in the lattice such that there are a series of ladders. The ladder rungs are oriented and after positioning, they are epoxied into place. Selected intersections of the fiber lattice are cut such that one side of the cut is highly reflective. A heater plate is included that contains heaters positioned on mesas and recesses used for fluid storage. The waveguide plate and the heater plate are mated such that the mesas bridge the saw cuts, simplifying part of the alignment. Manufacturability is improved by using thermally expanded core fiber as the optical fiber segments.

DETAILED DESCRIPTION OF THE DRAWINGS

Figure 1A:
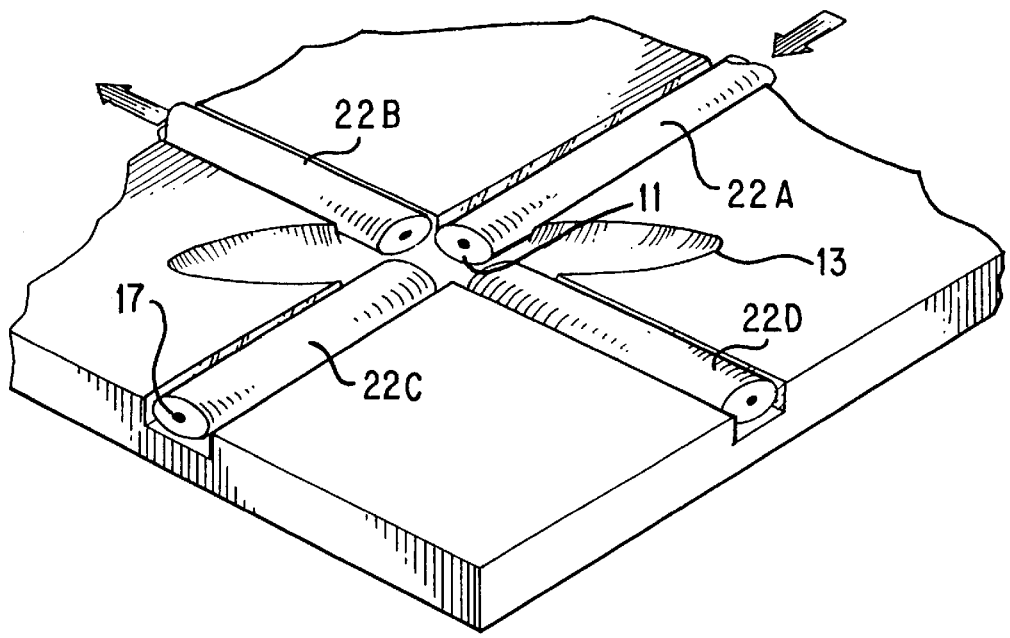
FIGS. 1A–C are views of a "resident bubble" optical fluid switch that creates a bubble in a filled liquid channel to redirect light at an intersection.
Figure 1B:
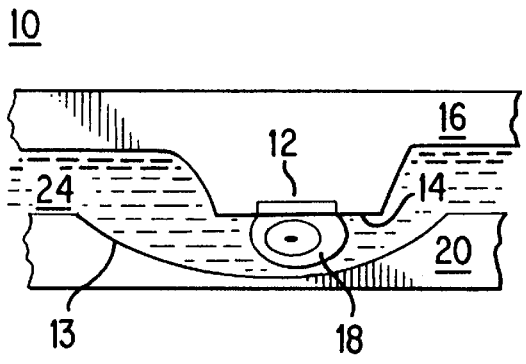
Figure 1C:
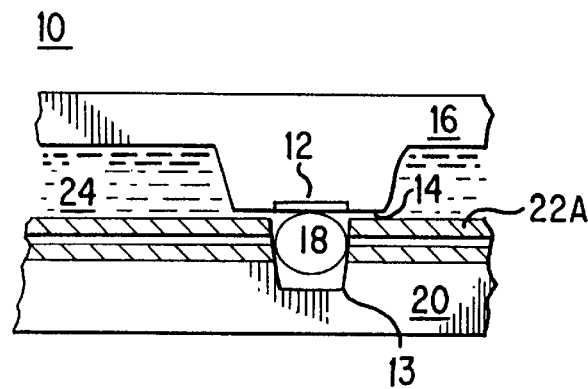

FIGS. 1A–C are views of a "resident bubble" embodiment of the optical fluid switch 10. FIG. 1A is a top, angled, view looking into the optical intersection 11. FIG. 1B is a front view of the intersection while FIG. 1C is a side view.

In FIG. 1A, an incoming fiber acts as a waveguide 22A. Light travels through the core 17 of the incoming waveguide 22A, and other fiber waveguides. At optical intersection 11, there is a shallow saw cut that exposes the cores of the incoming and outgoing waveguides 22A, 22C, 22D, respectively. One face of the shallow cut is highly reflective. The cut is positioned so that the incoming light will be reflected off the highly reflective face and exits along the core of the outgoing waveguide 22B, which has been simply butted up against the side of the incoming fiber. The redirection occurs because there is a difference in the indices of refraction between the fiber optic material and the vapor within the bubble 18. If the incoming light slightly misses the core 17 of the output waveguide 22B then loss occurs in the ON state. The placement of the saw cut determines the amount of ON loss in the fluid switch.

The above "cross" state corresponds to the ON state of the switch 10, where light is redirected from the incoming axis to the outgoing axis. When the bubble is turned off, the index matching liquid 24 in the body of the switch fills the intersection. The "bar" state corresponds to the OFF state, where incoming light is not redirected but rather continues along the incoming axis into waveguide 22C. The loss of light in the OFF state will be determined by spreading and scattering light through the fluid in the narrow saw cut.

A heater 12 is positioned on a mesa 14 of a heater plate 16, and creates a bubble 18. The bubble 18 is seen in FIGS. 1B–C and is created when the heater 12 is energized. The mesa 14 is made wide enough to straddle the width of the saw cut, preferably placing the heater 12 opposite the centerline of the optical waveguides 22A, 22B. The heater 12, i.e. a resistor, generates enough heat that a single bubble is formed above it. The bubble 18 is large enough to sufficiently contact the reflective side when the fluid switch is the ON state.

Figure 2A:
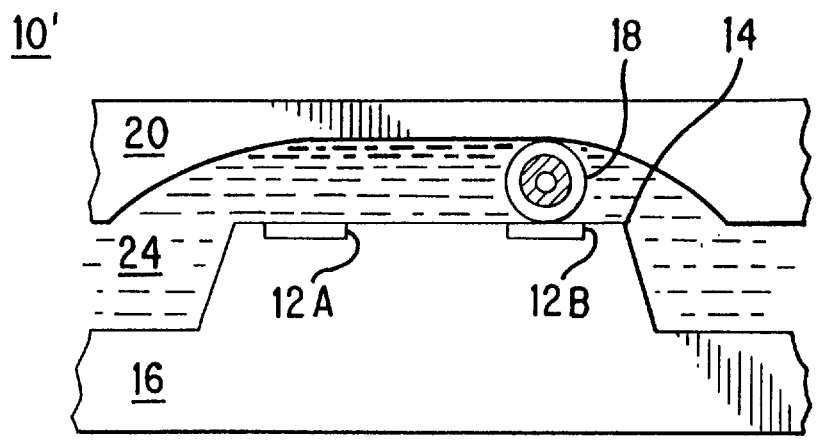
FIGS. 2A–B illustrate an alternate "resident bubble" optical fluid switch embodiment where the bubble in the liquid channel has two heaters.
Figure 2B:
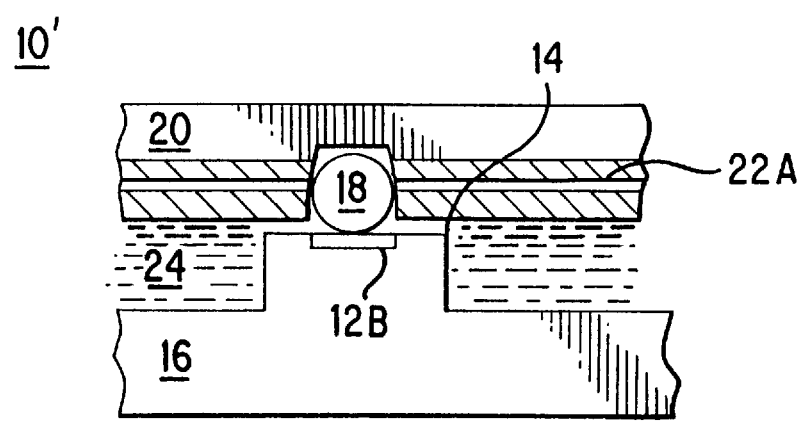

FIGS. 2A–B illustrate an alternate embodiment for the "resident bubble" fluid switch 10'. A first and a second heater 12A, 12B are positioned on the mesa 14. A bubble 18 is formed at the mirror face 11 which crosses the incoming waveguide 22A. When the first heater 12A is activated, a bubble 18 is formed and the switch 10' is placed in the ON or "cross" state. When the first heater 12A is turned off and the second heater 12B is activated, the bubble 18 migrates from the intersection to a position remote from the mirror face such that the mirror face is covered in liquid 24. The migration is reversible along the mesa (which may include a relief in it). The switch 10' is thus placed in the OFF or "bar" state. Additional heat may be required to prevent the bubble 18 from collapsing. It will collapse immediately if the vapor is at the boiling phase of the liquid 24. The bubble 18 will slowly collapse when the vapor is dissolved gas from the environment.

Figure 3:
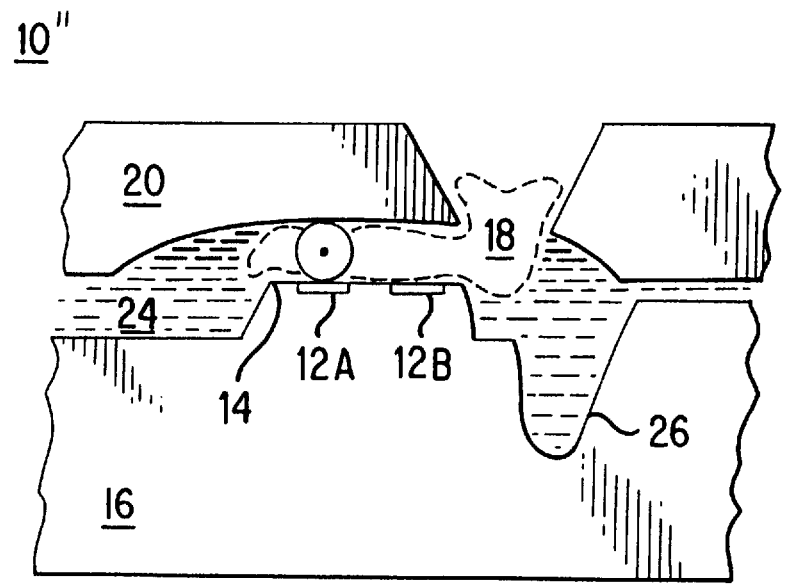
FIG. 3 is a cross-sectional view of an alternate fluid switch embodiment where an improperly sized bubble can be made to exit the switch area.

FIG. 3 illustrates another embodiment for the "resident bubble" fluid switch 10". When an improperly large bubble 18 fills the space above the mesa 14, the switch point is frozen in the "ON" state because neither heater 12A, 12B can move the bubble 18 away from the intersection. To remedy this, a via is placed near both heaters 12A, 12B. When the bubble 18 grows too large, both heaters 12A, 12B are activated and the increased heat pushes the bubble 18 part way into the via (as shown). At that point, the sloping sides of the via permit the bubble 18 to reduce its surface by popping out of the "vent". Then, a new, smaller bubble may be created. An optional reservoir channel 26 is shown to provide a liquid supply to the switching region from an external source.

Figure 4:
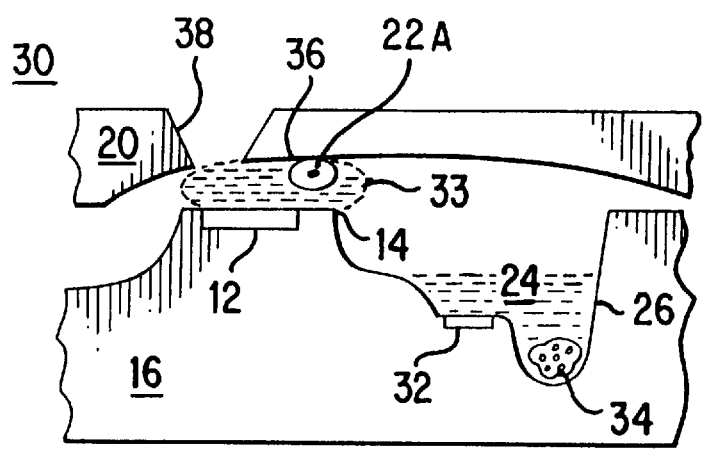
FIG. 4 illustrates the "expulsive" fluid switch where liquid is injected into and expelled from the intersection.

FIG. 4 shows an "expulsive" fluid switch 30. It is shown in the wet or OFF state with liquid 33 at the intersection 36. The space between the waveguide plate 20 and the heater plate 16 is filled with a gas, i.e. air. This switch uses less liquid, which is confined to the bottom or narrow spaces in the assembly. When liquid 33 is injected into the narrow spaces, as shown, it remains there until disturbed. A reservoir channel 26 provides incoming liquid 24 and an optional control sponge 34 regulates fluid from an external source. The level of the fluid is preferably kept just above the height of the impelling heater 32. The switch is put into the dry ON or "cross" state by energizing the first heater 12 at the intersection.

When the intersection is dry and the switch is in the ON or "cross" state, if the impelling heater 32 is energized, the liquid will boil. Some of the liquid is impelled into the region of the intersection above the mesa 14. This impelled liquid 33 in the intersection 36 allows light to continue along the axis of the incoming fiber 22A, and the switch goes to the OFF or wet state. The impelling heater 32 can be turned off when enough liquid 24 has been boiled.

When switching to the ON state heater 12 is energized. Then, some of the fluid 33 is vaporized while some is expelled from the intersection, leaving the area over the mesa 14 dry. In this embodiment, the fluid moves more than in the other embodiments, therefore paths and surfaces must be provided to allow capillary flow to move excess fluid back to the supply channel, the control sponge, and the external source. Fluid ejected from the vent 38 may be returned to the external source and a net fluid circulation can guarantee a fresh supply of fluid for the reservoir channel 26.

The sharp and soft corners in the assembly are arranged to increase wicking back to the reservoir channel 26 and the liquid level control sponge 34. An optional low surface energy layer, e.g. wax, may be applied to the cut of the optical fiber to reduce liquid clogging. An optional high surface energy liquid-loving layer may be applied to the resistor block to help liquid get back to the reservoir channel 26.

Spaces adjacent to the mesas 14 provide the breathing fluid flow path required for the bubble optical switches. When bubbles are generated or when bubbles suddenly move a flow of liquid occurs, internal breathing flow paths are required to relieve the local pressures. The breather holes, similar to the vents shown in FIG. 3 and 4, can be positioned in either the waveguide plate 20 or the heater plate 16.

Figure 5:
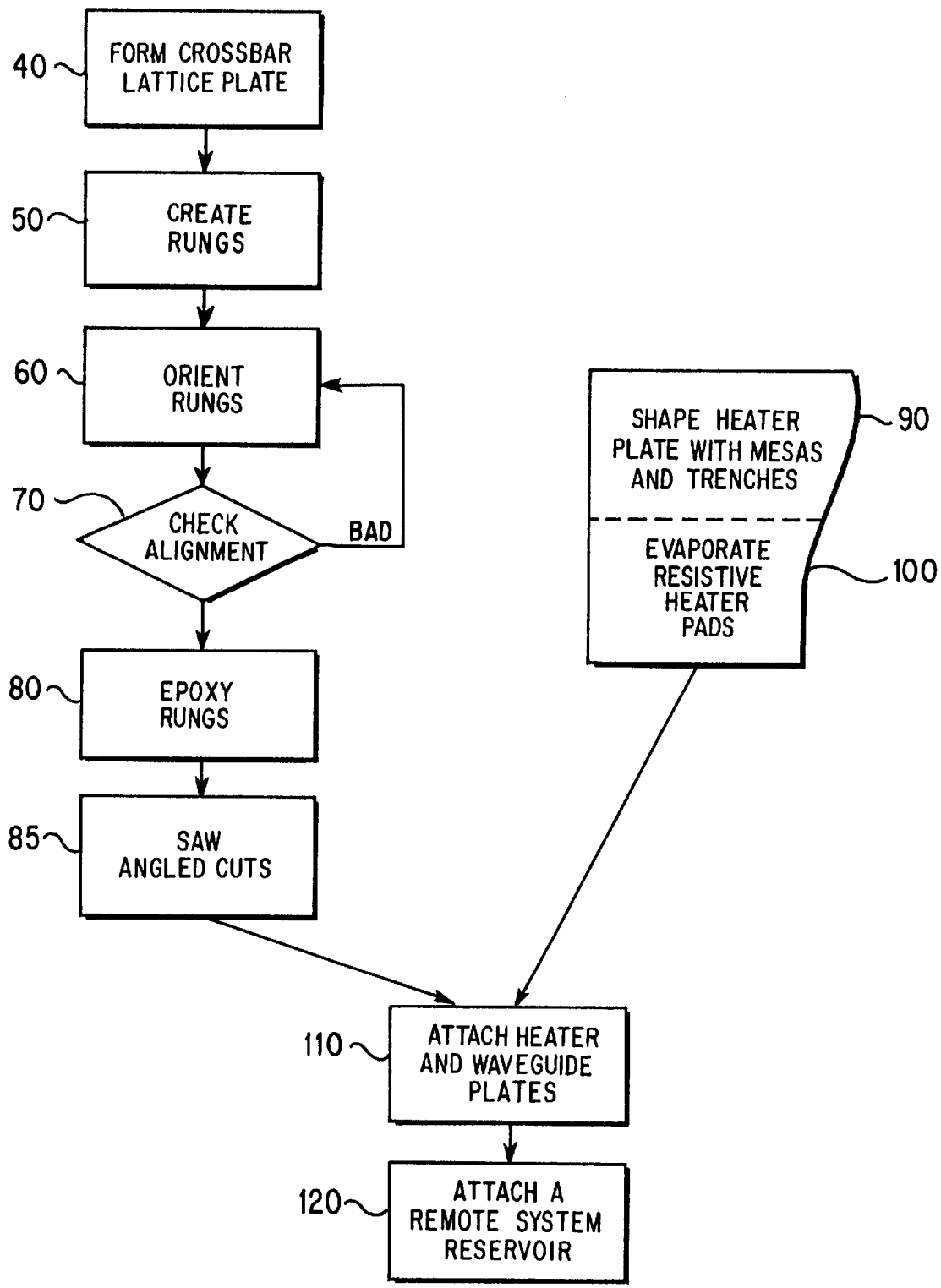
FIG. 5 illustrates a flow chart describing the method of the present invention involving a waveguide plate and a heater plate.
Figure 6A:
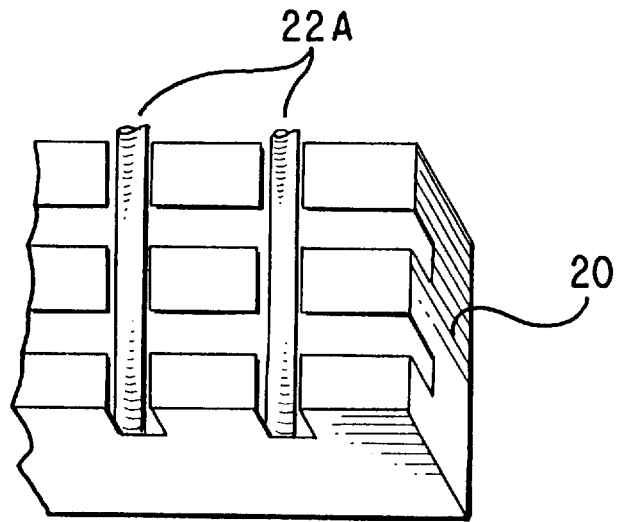
FIGS. 6A–B illustrate a partial and a completed waveguide plate prior to the final angled saw cuts at the cross points.
Figure 6B:
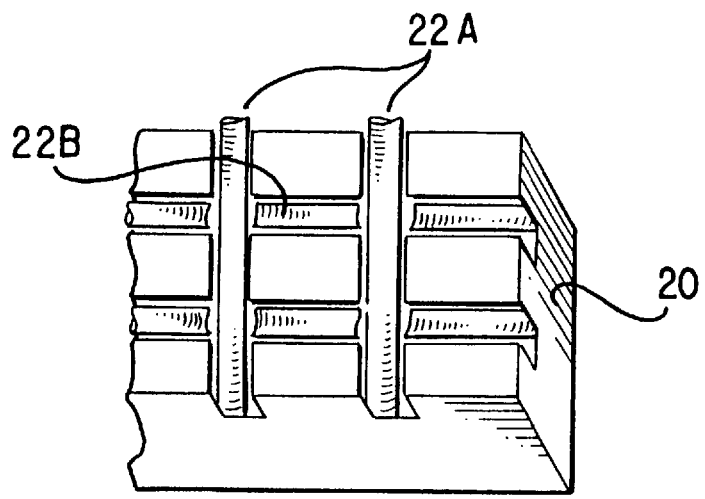
Figure 7A:
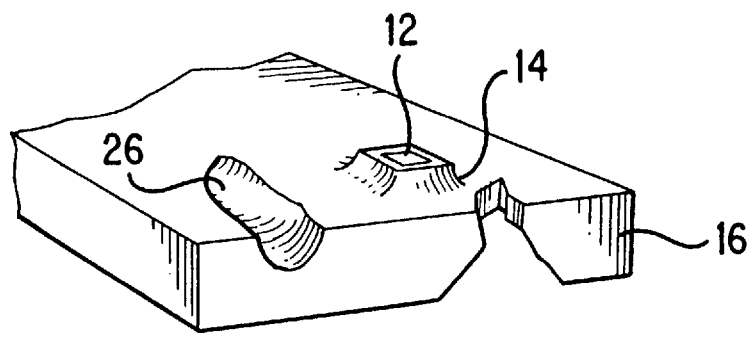
FIGS. 7A–C illustrate different embodiments of the heater plate.
Figure 7B:
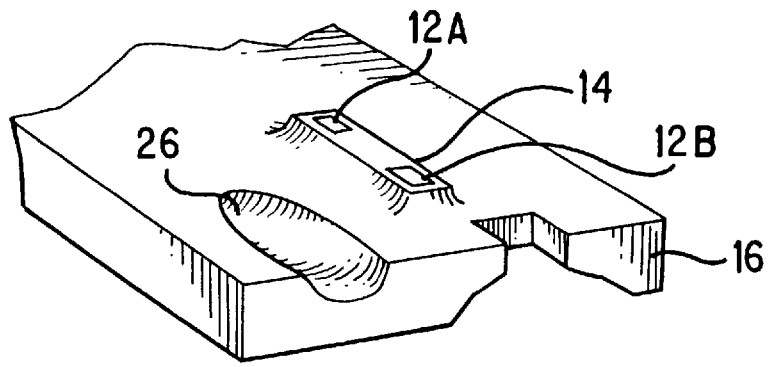

FIG. 5 shows a process flowchart for fabricating a fluid optical switch. Steps 40–80, further illustrated in FIGS. 6A–B, are directed towards fabricating the waveguide plate 20. Steps 90–100, further illustrated in FIGS. 7A–B, are directed towards fabricating the heater plate 16.

In step 40, illustrated in FIG. 6A, the waveguide plate 20 is prepared with saw cuts to form a crossbar lattice. By way of example, the stripes may be several millimeters apart and the crossing angle is 90 degrees. The cuts are 130 $\mu$m wide and 150 $\mu$m deep. Uprights of fiber 22A are laid in one dimension in the saw cuts. The fibers have a diameter of 125 $\mu$m.

In step 50, a set of cleavers, such as string of scribing disks (available from Fujikura), are placed apart for creating the ladder rungs 22B between the uprights 22A in the waveguide plate 20. Pressure cleaving of the suspended segments gives repeatable rungs for the waveguide plate 20.

In step 60, illustrated in FIG. 6B, a squeegee and jiggling fluid are applied for two reasons: first, to get the rungs 22B to fall into the spaces between the uprights 22A on the plate 20 and second, to nudge the rungs 22B to the right against the uprights 22A. The jiggling fluid, e.g. an un-set epoxy, lubricates the pieces of fiber. The waveguide plate 20 is combed to nudge the rungs 22B to the right with no gap. The gaps will occur on the left side of the rungs 22B.

In step 70, to check the alignment, and later guide the saw, light is sent across the fibers 22B from one side of the grid of fiber, i.e. the left side. Scattering light is observed at the gaps mentioned in step 60. These gaps indicate where the rungs 22B have been imperfectly butted into the uprights 22A. The color of this guiding light can be chosen for multi-mode operation of the fibers to enhance the scattering.

In step 80, the rungs 22B are epoxied into place. In step 85, light saw cuts are made on the waveguide plate. The saw cuts are placed precisely at the optical intersection 11 of the fiber cores between the rung and upright. These carefully spaced intersections are the intersections of the switch. The width of the saw cut accommodates the small length variations in the ladder rungs that create the gaps. The desired saw cut should be smooth to provide a smooth mirror face for good reflection.

Figure 7C:
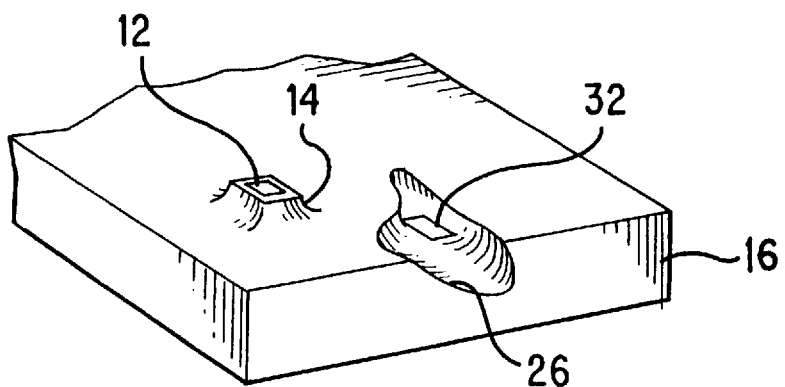

In step 90–100, the heater plate 16 is fabricated. The three parts of FIG. 7 show three kinds of heater plates where each plate corresponds to one of the embodiments of the invention discussed above. In this chart, the mesas, trenches, and vias are made on the plate first (step 90), and the heater resistors, with their associated electrical connections, are made (step 100).

In step 110, the aligned plates are epoxied into place. The heater plate, shown in FIGS. 7A–B, is applied such that the heaters 12, 12A are where the fiber junctions occur. These heaters create the bubbles which switch the light. These heaters 12, 12A, 12B, 32 are resistors that are used for evaporation and are placed on raised mesas 14 to be clear of the surrounding planes and are large enough to account for small variations in the intersections.

In step 120, a remote reservoir is attached to the trenches and spaces between the plates, i.e. by a group of wicks to the trenches. The level of the liquid in the spaces will be set by the negative hydrostatic head maintained in the remote reservoir. This head is controlled by means well known to those in the art.

I claim:

1. A method for fabricating fluid optical switches comprising the steps of:

forming a lattice with a plurality of intersections in a waveguide plate;

inserting optical fiber uprights into the lattice;

cleaving and inserting ladder rungs between the uprights in the waveguide plate;

orienting the ladder rungs;

selectively cutting the fibers at the intersections of the lattice at an angle; and placing the waveguide plate over a heater plate, that includes at least one heater on a mesa, such that a heater is at each cut intersection.

2. A method for fabricating fluid optical switches, as defined in claim 1, wherein the step of orienting the ladder rungs comprises the step of squeegeeing and brushing the ladder rungs into position.

3. A method for fabricating fluid optical switches, as defined in claim 1, further comprising the step of correcting the ladder rung orientation by observing scattered light at the ladder rungs.

4. A method for fabricating fluid optical switches, as defined in claim 1, wherein the step of selectively cutting the fibers further comprises the step of selectively positioning the saw cut by observing light at the ladder rungs.

5. A method for fabricating fluid optical switches, as defined in claim 1, further comprising the step of smoothing the saw cuts to provide a mirror face for good reflection.

6. A method for fabricating fluid optical switches, as defined in claim 5, wherein the step of smoothing the saw cuts includes applying a back-wicking of epoxy.

7. A method for fabricating fluid optical switches, as defined in claim 1, wherein the heater plate further includes a second heater on the mesa.

8. A method for fabricating fluid optical switches, as defined in claim 1, further comprising the step of applying a low surface energy layer to the cut of the waveguide plate to reduce liquid clogging.

9. A method for fabricating fluid optical switches, as defined in claim 1, further comprising the step of applying a high surface energy liquid-loving layer to the heater plate to help liquid get back to the reservoir.

10. A fluid optical switch comprising:

a waveguide plate, that includes a lattice of optical fiber, wherein the intersections of the lattice are cut such that one face is highly reflective;

a heater plate positioned below the waveguide plate, having a heater on a mesa and a trench such that a reservoir is formed, that includes a fluid, within the reservoir, having an air bubble; and wherein the switch is ON when a bubble is over the heater and OFF when the bubble is gone from the heater.

11. A fluid optical switch, as defined in claim 10, further comprising:

a second heater on the mesa, positioned near the first mesa; and wherein the switch is ON when the bubble is positioned over the first heater and OFF when the bubble is positioned over the second heater.

12. A vented fluid optical switch comprising:

a waveguide plate, that includes a lattice of optical fiber, wherein each intersection is cut such that one face is highly reflective, having a vent;

a heater plate positioned below the waveguide plate, having a heater on a mesa and a trench, the heater proximate to one of the intersections and near to the vent;

fluid within a trench, wherein the trench is a reservoir for the fluid; and a fluid injector, positioned within the reservoir, operative to create an injection of fluid;

wherein the switch is OFF when the injection of fluid covers the mesa and ON when the injection of fluid escapes from the intersection.

* * * * *